United States Patent Office 2,892,842
Patented June 30, 1959

2,892,842

4-m-HYDROXY PHENYL PIPERIDINES AND THEIR PREPARATION

Samuel M. McElvain, Madison, Wis.

No Drawing. Application March 17, 1958
Serial No. 721,688

5 Claims. (Cl. 260—294.7)

This invention relates to novel substituted piperidine compounds and to their nontoxic salts.

The novel piperidine bases provided by this invention can be represented by the following formula:

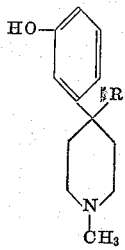

wherein R is an ethyl or a propyl radical.

Also included within the scope of this invention are the nontoxic, pharmaceutically acceptable acid addition salts of the compounds represented by the above formula. Nontoxic, pharmaceutically acceptable acid addition salts are prepared from acids which, when combined with the piperidine base, do not materially increase its toxicity. Among the nontoxic, pharmaceutically acceptable acids which can be employed to form salts with the bases of this invention are hydrochloric acid, sulfuric acid, maleic acid, tartaric acid, hydrobromic acid and the like.

The piperidine bases and salts of this invention are in general white, crystalline solids. The piperidine bases are only slightly soluble in water, whereas the salts, especially those prepared from acids of relatively low molecular weight, are quite water soluble. Those salts prepared from acids of high molecular weight are frequently characterized by a relatively low solubility in water.

The novel compounds of this invention exhibit analgesic properties when administered to mammals. The compounds can be administered either by the oral or parenteral route, although the latter is preferred since a more uniform analgesia is more readily produced with this mode of administration.

Parenteral dosage forms, such as sterile aqueous solutions, are readily obtained by dissolving a water soluble salt of the piperidine base in water and sterilizing the solutions as by filtration through a sterile filter. Suitable oral dosage forms include compressed tablets, filled capsules, suspensions, and the like, all of which are readily prepared from the piperidine bases or their salts by methods well known to the art.

As is the case with other analgesics, the dose requirement for adequate alleviation of pain is dependent on the type and severity of the pain and the individual response of the subject being treated. However, the compounds of this invention have analgesic potencies roughly comparable to that of morphine, and can be employed in dose amounts roughly comparable to those of morphine.

The bases corresponding to the above formula are prepared as follows: A m-methoxyphenylalkylketone is condensed with ethylcyanoacetate to form an alkylidene derivative which is reacted with the sodium salt of cyanoacetamide to yield a β-(m-methoxyphenyl)-β-alkyl-α,γ-dicyanoglutarimide. The glutarimide is heated sequentially with aqueous acid and aqueous alkali to hydrolyze the two cyano groups and the imide ring and to yield a tetracarboxylic acid which is decarboxylated by heat to form a β-(m-methoxyphenyl)-β-alkylglutaric acid. The substituted glutaric acid is esterified and the diester is reduced with lithium aluminum hydride to yield the corresponding glycol. This glycol is reductively aminated with methylamine to yield a 1-methyl-4-alkyl-4-m-methoxyphenylpiperidine, which is then heated with hydrobromic acid or a similar reagent to cleave the methyl ether and provide the desired 1-methyl-4-alkyl-4-m-hydroxyphenylpiperidine.

Pharmaceutically acceptable acid addition salts of the nitrogenous bases furnished by this invention are prepared by methods well known to the art. For example, a solution of the base in an organic solvent can be saturated with a gaseous acid such as hydrogen chloride, or the solution can be mixed with a solution containing an equimolar quantity of an organic or inorganic acid. The acid addition salt can be isolated by filtration if insoluble in the reaction mixture or by evaporation to dryness if soluble.

This invention is further illustrated by the following specific examples:

EXAMPLE 1

*Preparation of 1-methyl-4-propyl-4-m-hydroxyphenylpiperidine*

A mixture of 73.7 g. of m-methoxybutyrophenone, 47.2 g. of ethylcyanoacetate, 20.4 g. of glacial acetic acid, 6.8 g. of ammonium acetate and 85 ml. of benzene is placed in a round bottom flask equipped with a water separator. The reaction mixture is refluxed for about six hours during which time about 6 ml. of water collects in the water separator. The reaction mixture containing ethyl 1-(m-methoxyphenyl)-butylidenecyano acetate is cooled, and is washed three times with 100 ml. portions of water. The benzene layer is separated, is dried, and the benzene is evaporated in vacuo. The residue comprising ethyl 1-(m-methoxyphenyl)-butylidenecyanoacetate is distilled and boils at about 163–168° C. at a pressure of about 0.7 mm. of mercury. $n_D^{25}=1.5320$.

39.5 g. of cyanoacetamide are added to a stirred solution of sodium ethoxide prepared from 10.8 g. of sodium and 300 ml. of absolute ethanol, thus forming the sodium salt of cyanoacetamide. 64 g. of ethyl 1-(m-methoxyphenyl)-butylidenecyanoacetate are added to the reaction mixture with stirring. The reaction mixture is maintained at ambient room temperature for about sixteen hours. 2 l. of water are then added and the reaction mixture is acidified with concentrated hydrochloric acid to about a pH of 2, whereupon β-(m-methoxyphenyl)-β-propyl-α,γ-dicyanoglutarimide precipitates. The precipitate is filtered and is recrystallized from absolute ethanol. The purified compound melts at about 166.5–168.5° C.

A reaction mixture is prepared containing 36.5 g. of β-(m-methoxyphenyl) - β-propyl-a,γ-dicyanoglutarimide, 286 ml. of water, and 246 ml. of 18 M sulfuric acid. The mixture is refluxed for about 30 minutes. 1.1 l. of water are added, and after cooling, the reaction mixture is extracted five times with 300 ml. portions of ether. The ethereal extracts are combined, are dried, and the ether is removed by distillation. The residue is mixed with 112 ml. of 20 percent aqueous sodium hydroxide and the resulting mixture is heated under reflux temperature for about 48 hours. The reaction mixture is cooled and a solution containing 200 g. of 18 M sulfuric acid in 600 ml. of water is added thereto. The acidified mixture is heated at reflux temperature for about 2 hours, and is cooled and extracted five times with 300 ml. portions of ether. The ethereal extracts containing β-(m-methoxyphenyl)-β-propylglutaric acid formed by the above series of operations are combined and are dried. 1 l. of an ethereal solution containing diazomethane derived from 0.3 M of nitrosomethylurea is added thereto. After the esterification mixture stands for about ten minutes, the excess diazomethane is destroyed with glacial acetic acid. The ethereal solution containing dimethyl β-(m-methoxyphenyl)-β-propylglutarate formed in the above reaction is washed with about 200 ml. of 10 percent aqueous potassium bicarbonate followed by 200 ml. of water. The ethereal layer is separated, is dried, and the ether is removed by distillation. The residue is distilled, yielding dimethyl β-(m-methoxyphenyl)-β-propylglutarate boiling at about 162–163° C. at a pressure of about 0.35 mm. of mercury. $n_D^{25}=1.508$.

5.2 g. of finely powdered lithium aluminum hydride are added to about 400 ml. of anhydrous ether in a 3-neck, round bottom flask fitted with a Hershberg stirrer, a dropping funnel, and a reflux condenser protected with drying tube. This mixture is heated at about 35° C. for about one hour. 22.5 g. of dimethyl β-(m-methoxyphenyl)-β-propylglutarate are then added dropwise at such a rate as to maintain gentle refluxing of the ether. After the addition is completed, the reaction mixture is heated at about 35° C. for about one hour. The excess lithium aluminum hydride is destroyed by the cautious addition of 16 ml. of water and the reaction mixture is rinsed into a shaker with 65 ml. of 10 percent aqueous sulfuric acid. The ether layer containing 3-m-methoxyphenyl-3-propylpentane-1,5-diol is decanted, and the sludge remaining behind is triturated five times with about 100 ml. portions of ether. The combined ether layers are dried, and the ether is removed by distillation leaving as a residue 3-m-methoxyphenyl-3-propylpentane-1,5-diol. The compound is placed in a high pressure hydrogenation bomb with 15 ml. of methylamine, 5.4 g. of Adkins' copper chromium oxide, and 25 ml. of purified dioxane. The mixture is hydrogenated for one hour under a pressure of hydrogen of 4,000 lbs. per square inch and at a temperature of about 250° C. The hydrogenation mixture is cooled, is filtered and the filtrate is distilled. 1-methyl-4-propyl-4-m-methoxypiperidine boils at 125–129° C. at a pressure of about 0.4 mm. of mercury. $n_D^{25}=1.5255$.

14.5 g. of 1-methyl-4-propyl-4-m-methoxypiperidine and 70 ml. of 48 percent aqueous hydrobromic acid are refluxed for about one hour. The reaction mixture is cooled, is concentrated to about one-fourth its volume in vacuo, and is diluted with three volumes of water. The diluted solution is extracted twice with 100 ml. portions of ether, and the ether extracts are discarded. The aqueous layer is neutralized with 10 percent aqueous potassium bicarbonate, and the neutralized solution is evaporated to dryness in vacuo. The solid residue comprising a mixture of 1-methyl-4-propyl-4-hydroxyphenylpiperidine and inorganic salts is triturated with three 100 ml. portions of hot anhydrous ethanol. The ethanol layers are decanted from the inorganic salts, are combined, and the ethanol is evaporated in vacuo. The solid residue remaining in the flask yields 1-methyl-4-propyl-4-m-hydroxyphenylpiperidine melting at about 162–164° C. after recrystallization from an ethanol-water solvent mixture.

1-methyl-4-propyl-4-m-hydroxyphenylpiperidine prepared as above is dissolved in ether and the ether solution is saturated with anhydrous gaseous hydrogen chloride thus forming 1-methyl-4-propyl-4-m-hydroxyphenylpiperidine hydrochloride. The hydrochloride salt precipitates and is isolated by filtration. Recrystallization of the precipitate from isopropyl alcohol yields 1-methyl-4-propyl-4-m-hydroxypropylpiperidine hydrochloride melting at about 177–178° C.

*Analysis.*—Calculated: Cl, 13.14. Found: Cl, 12.97.

EXAMPLE 2

*Preparation of 1-methyl-4-ethyl-4-m-hydroxyphenylpiperidine*

The general procedure of Example 1 is followed to prepare 1-methyl-4-ethyl-4-m-hydroxyphenylpiperidine, except that the starting material is m-methoxypropiophenone in place of m-methoxybutyrophenone. The following outline lists the reactants and the characteristics of the intermediate products obtained in the course of preparing the compound.

Ethyl-1-(m-methoxyphenyl)-propylidinecyanoacetate is condensed with the sodium salt of cyanoacetamide to yield β-(m-methoxyphenyl)-β-ethyl-α,γ-dicyanoglutarimide which melts at about 169.5–170.5° C. The dicyanoglutarimide is heated successively with acid and then alkali to hydrolyze the cyano groups and split the imide ring. The product of the reaction, a tetracarboxylic acid, is decarboxylated by heat and the resulting substituted glutaric acid is esterified with diazomethane to yield dimethyl β-(m-methoxyphenyl)-β-ethoylglutarate boiling at about 180°–187° C. at a pressure of about 0.2 mm. of mercury. $n_D^{25}=1.511$.

*Analysis.*—Calculated: C, 65.29; H, 7.53. Found: C, 65.87; H, 7.61.

Dimethyl-β-(m-methoxyphenyl)-β-ethylglutarate is reduced with lithium aluminum hydride to yield 3-m-methoxy-phenyl-3-ethylpentane-1,5-diol which is in turn reductively aminated with methylamine under pressure in a hydrogen atmosphere using a copper chromium catalyst. The time of this reaction is, however, three hours instead of one hour as in Example 1. 1-methyl-4-ethyl-4-m-methoxyphenylpiperidine thus prepared distills in the range of 125–135° C. at a pressure of about 0.1 mm. of mercury.

The 1-methyl-4-ethyl-4-m-methoxyphenylpiperidine is treated with 48 percent hydrobromic acid to split the methoxy group. The 1-methyl-4-ethyl-4-m-hydroxyphenylpiperidine which is produced in the reaction mixture is isolated as a viscous oil by neutralizing the reaction mixture and extracting the base with ether.

The hydrochloride salt of 1-methyl-4-ethyl-4-m-hydroxyphenylpiperidine hydrochloride is prepared by treating an alcoholic solution of the base with hydrogen chloride. The hydrochloride salt melts at about 206–207° C. after a four-fold recrystallization from an ether-acetone solvent mixture.

*Analysis.*—Calculated: C, 65.73; H, 8.67; Cl, 13.86. Found: C, 65.58; H, 8.78; Cl, 13.78.

I claim:

1. A compound consisting of a nitrogenous base and the pharmaceutically acceptable nontoxic acid addition salts thereof, said base being represented by the formula:

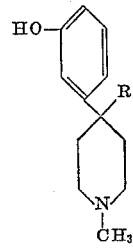

wherein R is a member of the group consisting of the ethyl and propyl radicals.

2. 1-methyl-4-propyl-4-m-hydroxyphenylpiperidine.
3. 1-methyl-4-ethyl-4-m-hydroxyphenylpiperidine.
4. 1-methyl-4-propyl-4-m-hydroxyphenylpiperidine hydrochloride.
5. 1-methyl-4-ethyl-4-m-hydroxyphenylpiperidine hydrochloride.

No references cited.